United States Patent Office 3,247,257
Patented Apr. 19, 1966

3,247,257
PREPARATION OF CARBORANE POLYOLS
Joseph Green, Dover, and Nathan Mayes, Ironia, N.J., assignors to Thiokol Chemical Corporation, Bristol, Pa., a corporation of Delaware
No Drawing. Filed Oct. 5, 1963, Ser. No. 313,703
5 Claims. (Cl. 260—606.5)

The present invention relates to the novel preparation of compounds containing boron.

In recent years, there has been considerable interest in boron-containing compounds because the high heat of combustion of these compounds adapts them for use as rocket fuels. According to the present invention, boron compounds have been prepared, which compounds are useful as intermediates in boron-containing polymers useful as high-energy fuels and as fuel additives. The solid products prepared according to the process of this invention, either per se or after formation into polymers, especially polymers such as polyesters and polyethers, can be used as solid propellants for rocket power plants and other jet-propelled devices when mixed with suitable oxidizers such as ammonium, potassium, or sodium perchlorates, ammonium nitrate, etc. Such propellant mixtures are compounded by a number of techniques known to the art. For example, the mixtures may comprise from 5 to 35 parts by weight of boron-containing materials and from 65 to 95 parts by weight of solid oxidizing agents mixed therewith. In some cases the propellant may also be made by combining the boron compounds and oxidizing agents with a curable polymer, for example, of the polyethylene, polyurethane, polyester or polyether types.

Other products prepared by the method of this invention may be used as additives in high energy liquid fuels by mixing the products with combustible liquids such as compatible hydrocarbon fuels.

The boron-containing compounds herein described may all be considered derivatives of carborane, which is a compound of carbon, hydrogen and boron, having the empirical formula $C_2H_{12}B_{10}$. Carborane is a solid material melting at 287°–288° C. It is characterized by a surprisingly stable nuclear structure and two labile hydrogen atoms, one connected to each carbon atom. It may be conveniently represented by the formula H$\theta$H, where $\theta$ is $C_2H_{10}B_{10}$ of the structure

with the generalized, de-localized pi bonding as indicated between the carbon and boron atoms. While there is some difference of opinion as to the molecular structure of carborane, its stability is usually attributed to a basket-shaped molecular configuration in which the ten boron atoms and two carbon atoms may be arranged at the apices of an icosahedron.

The present invention relates to the preparation of carborane polyols of the formula

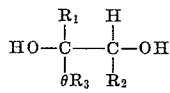

where $R_1$ and $R_2$ are hydrocarbon groups and preferably lower alkyl groups such as those having from 1 to 4 carbon atoms or hydrogen, and where $R_3$ is such a hydrocarbon group or hydrogen or a polyol group of the formula

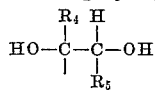

where $R_4$ and $R_5$ are hydrocarbon groups, preferably lower alkyl groups such as those having from 1 to 4 carbon atoms or hydrogen.

These carborane diols are obtained by reacting an epoxy compound of the formula

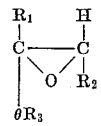

where $R_1$, $R_2$ and $R_3$ are as described above, with water in the presence of an acid catalyst. $R_1$, $R_2$ and $R_3$ may be branched or straight chains; however, compounds with straight chains are preferred over those with excessively branched chains because of the greater probability of steric hindrance of the reaction when the latter materials are used, and consequently low or negligible yields of the products may be realized.

It is also possible to convert the corresponding di-epoxy compounds, such as those prepared from the dialkenylcarboranes disclosed in commonly owned copending application Serial No. 59,460, filed September 29, 1960, to polyol compounds. Thus diisopropenylcarborane can be converted to a polyol by the following reaction:

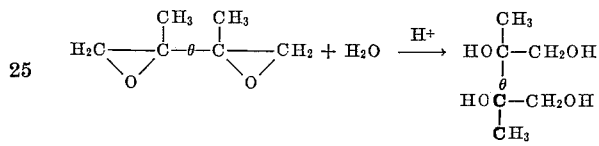

Thus the process of the instant invention is seen to be applicable to the production of various polyol carborane compounds in addition to the diols.

Epoxy compounds suitable for use in the present process may be readily prepared by reacting, in an inert solvent medium, hydrogen peroxide, trifluoroacetic anhydride, and an alkenyl carborane compound, thus forming trifluoroperacetic acid and causing it to act as an epoxidizing agent converting the alkenyl carborane to the corresponding epoxy compound.

Thus the preparation of epoxyisopropenylcarborane is believed to proceed according to the following formulae:

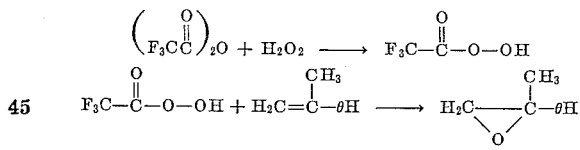

The alkenyl carboranes useful in synthesizing the epoxidized material can be prepared by the method described in commonly owned co-pending application Serial No. 59,460, filed September 29, 1960. For example, isopropenylcarborane can be prepared by heting isopropenyl acetylene with bis(acetonitrile)decaborane in refluxing benzene for 24 hours.

A typical procedure for producing the epoxy compounds follows:

6.2 grams of isopropenylcarborane and 1 ml. of 90% hydrogen peroxide are stirred in 25 ml. of methylene dichloride at 80° C. The mixture is then cooled to 0° C. and 6.4 ml. of trifluoroacetic anhydride is slowly added to the mixture. The reaction mix is stirred at about 20° to 25° C. for 12 to 18 hours, after which it is washed successively with sodium bisulfite solution, sodium hydroxide solution, and water. The solvent is then evaporated, leaving an epoxy compound of the formula

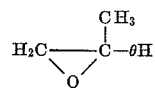

As will be evident to those skilled in the art, this procedure is suitable for preparing homologous and analogous epoxy compounds.

Acid catalysts suitable for promoting the reaction between the above-described epoxy compounds and water to form carborane diols may be suitably chosen from protonic acids and other electron-accepting compounds, such as boron trifluoride, which are known to the art as Lewis acids. Sulfuric acid is conveniently used in the process of the invention.

The reaction between water and the epoxy compounds proceeds suitably at room temperature, but higher or lower temperatures may be used when convenient. Normally, higher temperatures such as a refluxing temperature of the reaction mix at atmospheric pressure will be desirable to shorten the reaction time. However, care should be taken to avoid very high temperatures resulting in the decomposition of the reactants and products. Temperature of from 60° C. up to 160° C. seem advantageous for the process of the present invention.

In all cases the reactants are suitably maintained in contact for a time permitting substantially complete reaction. The reaction time is not critical and will vary with the reaction temperature, concentration, etc., as is usual in chemical reactions. The product is conveniently recovered, depending upon its solubility characteristics, by techniques known in the art, such as by crystallization by cooling of the mother liquor, by addition of a quantity of a relatively poor solvent for the product, or by evaporation of the mother liquor.

In order to point out more fully the nature of the present invention, the following specific example is given as an illustrative embodiment of the present process and a product produced thereby.

Example

The following materials were charged to a reactor equipped with a reflux column:

| | Grams |
|---|---|
| Epoxyisopropenylcarborane | 32.74 |
| Water | 20.00 |
| Concentrated sulphuric acid | 0.3 |

This reaction mix was refluxed for 24 hours; thereupon the reaction mix was distilled at 140° C. and 0.7 mm. of mercury absolute pressure. A yield of 16.6 grams of a white crystalline solid was obtained. The solid was soluble in heptane and had a melting point at 91–93° C. Chemical analysis indicated the product to have an empirical formula of $C_5H_{18}O_2B_{10}$, which corresponds to the formula of the diol compound 1,2-dihydroxy-2-carboranyl propane.

Analysis of elements:

| | C | H | B |
|---|---|---|---|
| Calculated | 27.49 | 8.30 | 49.54 |
| Experimental | 26.69 | 8.15 | 50.59 |

It is of course to be understood that the foregoing example is intended to be illustrative and that numerous changes can be made in the reactants, proportions, and conditions set forth therein without departing from the spirit of the invention as defined in the appended claims.

We claim:

1. A process for the preparation of boron-containing diols comprising reacting an epoxy alkenylcarborane with water in the presence of a Lewis acid catalyst, to form a polyol reaction product, and isolating the reaction product.

2. A process as in claim 1 wherein the acid is sulfuric acid.

3. A process as in claim 1 wherein the epoxyalkenylcarborane is epoxyisopropenylcarborane.

4. A process as in claim 1 wherein the epoxyalkenylcarborane is a diepoxyalkenylcarborane.

5. The compound

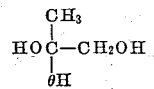

where $\theta$ is $C_2H_{10}B_{10}$.

No references cited.

TOBIAS E. LEVOW, *Primary Examiner.*

REUBEN EPSTEIN, *Examiner.*